Sept. 12, 1961          A. Y. DODGE          2,999,574
VARIABLE SPEED DRIVE
Filed Oct. 12, 1959
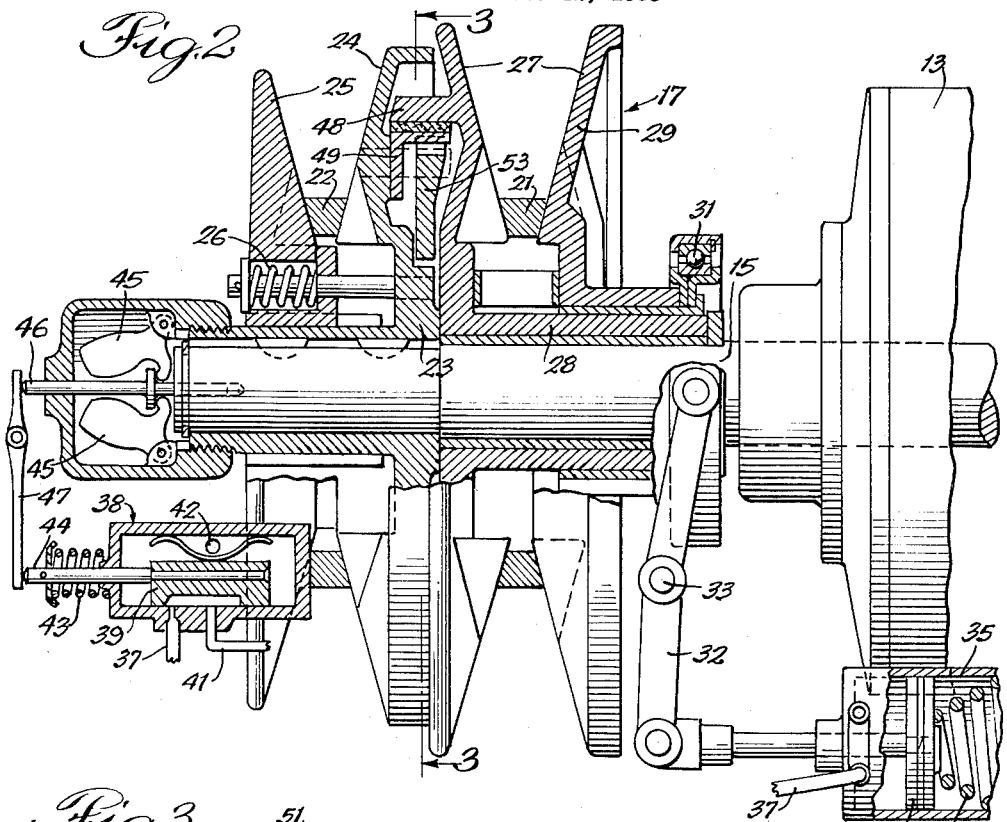
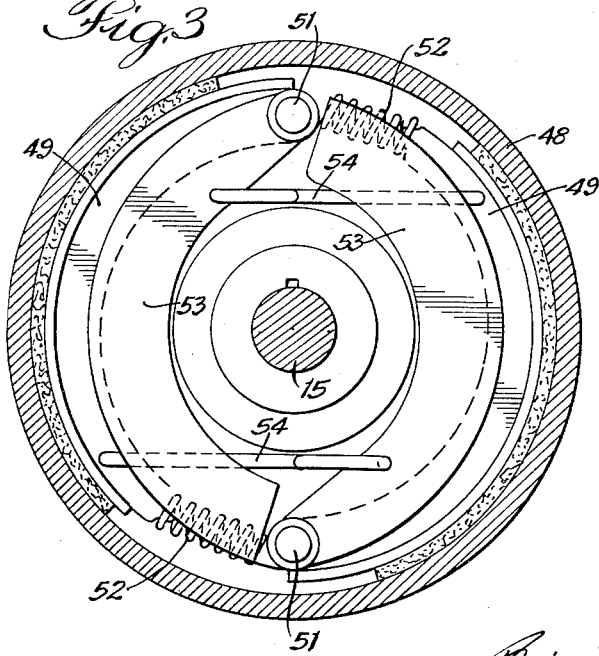
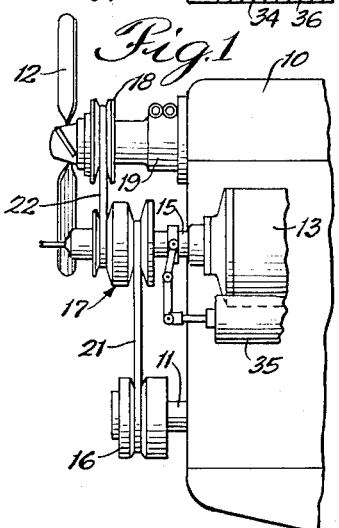
INVENTOR.
Adiel Y. Dodge,
BY
Blair Freeman & Molinare
ATTORNEYS.

2,999,574
VARIABLE SPEED DRIVE
Adiel Y. Dodge, % A. Y. Dodge Co., 206 S. Main St., Rockford, Ill.
Filed Oct. 12, 1959, Ser. No. 845,785
8 Claims. (Cl. 192—3.5)

This invention relates to variable speed drives and more particularly to an automatically variable speed belt drive for the fan and accessories of internal combustion engines.

Various types of variable speed drives for the fan and other accessories of interal combustion engines have heretofore been proposed of which one very desirable arrangement is disclosed and claimed in my co-pending application Serial No. 750,009, filed July 21, 1958, now matured into Patent No. 2,917,937. In all such drives, there is a danger that the fan and accessories may be driven at dangerously high speeds due to delay or failure of the controls or due to engine speeds in excess of the engine speed for which the drive is designed. The driving mechanism and the fan and the accessories may also be subjected to severe shocks resulting from extremely rapid engine acceleration exceeding the rate of response of the variable speed mechanism which would be likely to damage some of the parts.

It is accordingly an object of the present invention to provide the variable speed drive in which the driving connection between the engine and its accessories is disconnected above a predetermind speed of the accessories.

According to a feature of the invention, an overspeed release clutch is incorporated in the drive to release above a predetermined speed of the accessory shaft. Such a clutch acts as a supplemental control to extend the effective control range of the variable speed mechanism to extremely high engine speeds and also functions as a safety device to prevent damage to the accessories or the driving mechanism in the event of a delay of the normal control means.

A further object is to provide a variable speed drive in which disconnection of the driving connection between the engine and its accessories is effected in response to both speed and acceleration.

According to a feature of the invention, a clutch in the driven mechanism is controlled by elongated weights pivoted at one end and extending circumferentially from their pivots to move in response to both centrifugal force and acceleration force to release the clutch.

The above and other objects and features of the invention will be more readily apparent from the following description when read in connection with the accompanying drawing, in which:

FIGURE 1 is a side elevation of a portion of an engine equipped with a variable speed drive embodying the invention;

FIGURE 2 is an enlarged partial section with parts in elevation of the variable sheaves and accessory shaft; and FIGURE 3 is a section on the line 3—3 of FIGURE 2.

As shown in FIGURE 1, the variable speed drive of the present invention is applied to driving the fan and accessories of an internal combustion engine, partially shown at 10, which has a driving shaft 11 which may be an extension of the crankshaft. The engine is provided with a cooling fan 12 mounted behind the radiator for the cooling system in the usual manner and in addition has various other accesories such as a pump, indicated at 13, for supplying operating fluid to power steering mechanism, window operators, and the like. The pump 13 together with such other accessories as may be required is connected to an accessory drive shaft 15.

To drive the fan and the accessory shaft, the driving shaft 11 carries a driving sheave, indicated generally at 16, and the accessory shaft 15 carries a double sheave, indicated at 17. The fan shaft carries a driven sheave 18 which may take the form of that more particularly shown and described in my Patent No. 2,658,400. As best shown in that patent, the sheave 18 is adapted to have its effective diameter varied in response to the temperature of the cooling liquid in the engine under the control of a thermostat mounted in a housing 19 on the engine block which communicates with the cooling system. As disclosed in said patent, the sheave 18 is adjusted in a direction to increase its effective diameter when the cooling liquid is cool and to decrease its effective diameter thereby to increase the fan speed when the cooling liquid is hot. A belt 21 is trained over the driving sheave 16 and one section of the double sheave 17 and a similar belt 22 is trained over the other section or the double sheave and the driven sheave 18 so that the accessory shaft and the fan will both be driven when the engine is operating.

The double sheave 17 is constructed, as best seen in FIGURE 2, with a hub 23 secured on the accessory shaft 15 against axial and rotational movement. The hub is formed with an outwardly projecting annular flange 24 providing a conical face on one side and preferably hollow on its opposite side to receive the clutch mechanism described hereinafter. The conical face of the flange 24 faces a conical surface on a sheave element 25 which is slidable on the hub 23 and is urged toward the flange 24 by springs 26. The belt 22 engages the conical surfaces of the flange 24 and the sheave element 25, as shown, and will shift the element 25 away from the flange 24 in response to belt tension as the effective diameter of the fan driving sheave 18 varies.

The double sheave 17 is completed by a sheave element 27 lying adjacent to the flange 24 and facing in the opposite direction. The sheave element 27 is mounted on a hub 28 which is rotatable on the shaft 15, but which is held against axial movement thereon. A second conical sheave element 29 is slidable axially on the hub 28 toward and away from the sheave element 27. The belt 21 engages between the conical surfaces of the elements 27 and 29, as shown.

The sheave element 29 is shifted axially toward and away from the element 27 to vary the effective diameter of the right-hand section of the double sheave 17 in response to the speed of the accessory shaft. For this purpose, the sheave element 29 is connected through a bearing 31 with a yoke 32 pivoted intermediate its ends at 33 with the piston 34 of a fluid motor, including a cylinder 35 within which the piston is slidable. A spring 36 within the cylinder 35 urges the piston 34 to the left, as seen in the drawings, to shift the sheave element 29 to the right away from the element 27 to provide minimum effective diameter of the right-hand section of the double sheave element. To shift the sheave element 29 to the left, thereby to increase the effective diameter of the right-hand section, the left end of the cylinder 35 is adapted to be connected to a source of pressure through a conduit 37 and a valve, indicated generally at 38. The valve, as shown, is a slide valve having a shiftable sliding element 39 which will either connect the conduit 37 to a low pressure source, as a suction side of a fluid pump, through the conduit 41 or to a high pressure source, such as the high pressure side of a fluid pump through a port 42. The valve 39 is normally held to the left in the position shown by a spring 43 acting on a stem 44 connected to the valve in which the conduit 37 is connected to the low pressure source so that the spring will shift the piston 34 to the left, as shown, to provide minimum effective diameter of the right-hand section of the double sheave.

To shift the valve to the right thereby to connect the conduit 37 to the high pressure source through the port 42, speed responsive means connected to the auxiliary shaft 15 is employed. This means, as shown, comprises a pair of centrifugal weights 45 secured to the auxiliary shaft 15 and engaging a collar on a slidable rod 46. The rod 46 engages the upper end of a lever 47 pivoted at its center and whose lower end engages the valve stem 44. As the speed of the shaft 15 rises, the weights 45 will fly out urging the rod 46 to the left and acting through the lever 47 to shift the valve 39 to the right. When the valve has been shifted sufficiently to uncover the port of conduit 37, pressure will be supplied through the conduit 37 to the left end of the cylinder 35 to shift the piston 34 to the right against the spring 36 and thereby to move the sheave element 29 to the right to increase the effective diameter of the right-hand section of the double sheave. In this way, the diameter of the right-hand section of the double sheave is varied in a direction tending to maintain the speed of the auxiliary shaft constant and the mechanism will act within the limits of its range of operation to maintain the accessory shaft speed constant within reasonably close limits.

To connect the two sections of the double sheave thereby to connect the right-hand section to the auxiliary shaft and to the fan driving section, a releasable clutch is provided which is, according to the present invention, responsive to both speed and acceleration. As shown, the clutch it formed by an annular flange 48 on the sheave element 27 defining an inwardly facing annular friction drum. The flange is adapted to be frictionally engaged by a pair of arcuate friction shoes 49 pivoted at one end of each on diametrically opposite pivot pins 51 carried by the sheave element 24. Compression springs 52 act between the opposite ends of the respective friction shoes and the opposite pivot pins to urge the friction shoes radially outward to bring the friction surfaces thereof into driving engagement with the drum 48.

The shoes are adapted to be moved inward out of engagement with the drum by means of elongated weights 53, each of which is pivoted at one end on one of the pivots 51 and which extend circumferentially in a counterclockwise direction from their pivot points. The weights are cross-connected to the respective friction shoes by means of tension links 54 in such a way that the weight at the left side, as seen in FIGURE 3, is connected to the free end of the friction shoe at the right side, as seen in FIGURE 3. Thus, as the weights move out in response to centrifugal and acceleration forces, they will pull the friction shoes out of engagement with the drum 48 to interrupt the driving connection between the right-hand section of the double sheave and the accessory shaft.

In operation under normal conditions the effective diameter of the right-hand section of the double sheave will be controlled by the governor 45 to maintain the speed of the accessory shaft substantially constant and the friction shoes will remain in engagement with the drum 48. The fan speed will be independently controlled by the thermostat 19 varying the effective diameter of the sheave 18 with the diameter of the left-hand section of the double sheave automatically varying inversely to the sheave 18 by yielding of the springs 26.

If, for any reason, the speed of the accessory shaft 15 should become excessive, centrifugal force will move the weights 53 outward compressing the springs 52 and moving the friction shoes 49 out of engagement with the drum 48. The driving connection between the right-hand section of the double sheave will thus be relieved to the point where slippage will occur so that the accessory shaft and the fan cannot under any circumstances be driven above a predetermined safe speed. Due to the manner in which the weights are mounted, they will also tend to swing out in response to rapid acceleration in a counterclockwise direction, as seen in FIGURE 3, which is the normal driving direction. Thus, if the engine should accelerate at an excessive rate, the weights will tend to fly out regardless of actual speed either to disengage the friction shoes 49 from the drum 48 or to relieve the pressure therebetween to the point where slippage can occur so that the accessory shaft, the accessories and the fan will not be subjected to excessive acceleration or to torsional shocks which might damage them.

It will be seen that the clutch mechanism constitutes a supplementary control functioning to prevent excessive speeds of the accessories and fan regardless of the fact that engine speeds may, for some reason, become excessive temporarily and also functioning to eliminate possible damage resulting from shock due to excessive acceleration.

These features substantially increase the usefulness of the variable speed drive and eliminate possible damage which might otherwise result.

While one embodiment of the invention has been shown and described herein, it will be understood that it is illustrative only and not to be taken as a definition of the scope of the invention, reference being had for this purpose to the appended claims.

What is claimed is:

1. A variable speed drive for engine accessories comprising a variable driving sheave, an accessory shaft, a variable driven sheave rotatably mounted on the accessory shaft, a belt connecting the driving and driven sheaves, means including parts responsive to the speed of the accessory shaft to vary the effective diameter of the driven sheave in a direction tending to maintain the speed of the driven sheave constant regardless of the speed of the driving sheave, a releasable clutch connecting the driven sheave to the accessory shaft, and control means responsive to the speed of the accessory shaft to release the clutch when the speed exceeds a predetermined amount.

2. A variable speed drive for engine accessories comprising a variable driving sheave, an accessory shaft, a variable driven sheave rotatably mounted on the accessory shaft, a belt connecting the driving and driven sheaves, means including parts responsive to the speed of the accessory shaft to vary the effective diameter of the driven sheave in a direction tending to maintain the speed of the driven sheave constant regardless of the speed of the driving sheave, a releasable clutch connecting the driven sheave to the accessory shaft, and a circumferentially extending weight pivotally secured at one end to the accessory shaft to turn therewith and free to move radially outward at its other end and operatively connected to the clutch to release it, the weight moving outward in response to both speed and acceleration of the accessory shaft to release the clutch.

3. A variable speed drive for engine accessories comprising a variable driving sheave, an accessory shaft, a variable driven sheave rotatably mounted on the accessory shaft, a belt connecting the driving and driven sheaves, means including parts responsive to the speed of the accessory shaft to vary the effective diameter of the driven sheave in a direction tending to maintain the speed of the driven sheave constant regardless of the speed of the driving sheave, a releasable clutch connecting the driven sheave to the accessory shaft, said clutch including an annular drum connected to the driven sheave and a friction shoe movable radially into engagement with the drum and connected to the auxiliary shaft for rotation therewith, and control means for the clutch including an elongated weight pivotally connected at one end to the auxiliary shaft and extending circumferentially from its pivot within the drum and a connection from the weight to the shoe to move the shoe away from the drum in response to a predetermined speed and acceleration of the drum.

4. A variable speed drive for the accessories and fan of an engine comprising a variable diameter sheave drivably connected to the engine, a variable diameter driven sheave adapted to be secured to a fan, the diameter of the driven sheave being variable in response to the temperature of the engine, a two section variable diameter sheave adapted to be mounted on the accessory shaft of the engine with its first section rotatable relative to the shaft and its second section secured to the shaft, a belt connecting the driving sheave to the first section of the double sheave, a belt connecting the second section of the double sheave to the driven sheave, means including parts responsive to the speed of the auxiliary shaft to vary the effective diameter of the fist section of the double sheave in a direction tending to maintain the speed of the auxiliary shaft constant, a clutch connecting the first and second sections of the double sheave, and control means responsive to the speed of the second section to release the clutch above a predetermined speed.

5. The variable speed drive of claim 4 in which the control means comprises an elongated weight pivotally connected at one end to the second section and extending circumferentially from its pivot to respond to both speed and acceleration of the second section.

6. A variable speed drive for the accessories and fan of an engine comprising a variable diameter sheave drivably connected to the engine, a variable diameter driven sheave adapted to be secured to a fan, the diameter of the driven sheave being variable in response to the temperature of the engine, a two section variable diameter sheave adapted to be mounted on the accessory shaft of the engine with its first section rotatable relative to the shaft and its second section secured to the shaft, a belt connecting the driving sheave to the first section of the double sheave, a belt connecting the second section of the double sheave to the driven sheave, means responsive to the speed of the auxiliary shaft to vary the effective diameter of the first section of the double sheave in a direction tending to maintain the speed of the auxiliary shaft constant, an annular drum on the first section, a friction shoe mounted on the second section for radial movement into and out of engagement with the drum, an elongated weight pivoted at one end on the second section and extending circumferentially from its pivot, and a connection from the weight to the shoe to disengage the shoe from the drum in response to centrifugal and acceleration forces on the weight.

7. A variable speed drive for an engine having a driving shaft and an accessory shaft comprising a variable driving sheave mounted on the driving shaft, a variable driven sheave mounted on the accessory shaft, a belt drivably connecting the sheaves, means including parts responsive to the speed of the accessory shaft to vary the effective diameter of the driven sheave in a direction tending to maintain the speed of the driven sheave constant, releasable clutch means drivably to connect one of the sheaves to the shaft on which it is mounted, and means responsive to the speed of the last named shaft urging the clutch to its released position.

8. The variable speed drive of claim 7 in which the engine further has a fan, a sheave connected to the fan, a second sheave on the accessory shaft, and a belt drivably connecting the fan sheave and the second sheave.

References Cited in the file of this patent

UNITED STATES PATENTS 2,917,937     Dodge _____ Dec. 22, 1959